United States Patent [19]

Messer

[11] 4,268,417
[45] May 19, 1981

[54] METHOD OF MAKING ACTIVATED CARBON

[75] Inventor: Leonard Messer, Pittsburgh, Pa.

[73] Assignee: American Minechem Corporation, Coraopolis, Pa.

[21] Appl. No.: 17,995

[22] Filed: Mar. 7, 1979

Related U.S. Application Data

[63] Continuation of Ser. No. 836,278, Sep. 26, 1977, abandoned, which is a continuation-in-part of Ser. No. 818,636, Jul. 25, 1977, abandoned, which is a continuation of Ser. No. 592,762, Jul. 3, 1975, abandoned.

[51] Int. Cl.¹ .................... C01B 31/10; C01B 31/14; B01J 20/30; B01J 21/18
[52] U.S. Cl. .................................. 252/421; 201/6; 252/445; 264/117
[58] Field of Search ............... 252/421, 445; 423/449; 201/6

[56] References Cited

U.S. PATENT DOCUMENTS

| | | | |
|---|---|---|---|
| 1,478,986 | 12/1923 | Morrell | 252/421 |
| 2,008,145 | 7/1935 | Morrell | 252/421 |
| 2,040,931 | 5/1936 | Fuchs | 252/421 |
| 3,483,134 | 12/1969 | Olsoh | 252/421 |
| 3,533,961 | 10/1970 | Voet et al. | 252/421 |
| 3,541,025 | 11/1970 | Oda et al. | 252/421 |
| 3,623,999 | 11/1971 | Jungten | 252/421 |
| 3,637,464 | 1/1972 | Walsh et al. | 201/6 |
| 3,998,604 | 12/1976 | Hinkley | 252/421 |

Primary Examiner—P. E. Konopka
Attorney, Agent, or Firm—Reed, Smith, Shaw & McClay

[57] ABSTRACT

Activated carbon is made by forming a slurry of carbonaceous and non-carbonaceous fine particles, preferably finely divided non-caking coal, in a suspension liquid, preferably water, comprised of at least 60 percent suspension liquid by weight. Preferably, the geometric mean particle size of the fine particles dispersed in the suspension liquid is less than 150 microns. A free-flowing liquid, which is liquid below 80° C. and preferably below 20° C., lyophobic to the suspension liquid and the non-carbonaceous fine particles and lyophilic to the carbonaceous fine particles, is added to the slurry to form a mixture where less than 20 percent by weight of the free-flowing liquid and the carbonaceous and non-carbonaceous fine particles is free-flowing liquid. The resulting mixture is then agitated to preferentially agglomerate the carbonaceous fine particles to form discrete agglomerates, while the non-carbonaceous fine particles remain substantially unagglomerated in the slurry. The discrete agglomerates of carbonaceous material are thereafter separated from the mixture, and carbonized by heating to greater than about 400° C. Then the separated discrete agglomerates are activated to form activated carbon preferably by heating to greater than 800° C. in the presence of steam, carbon dioxide or flue gas.

7 Claims, 2 Drawing Figures

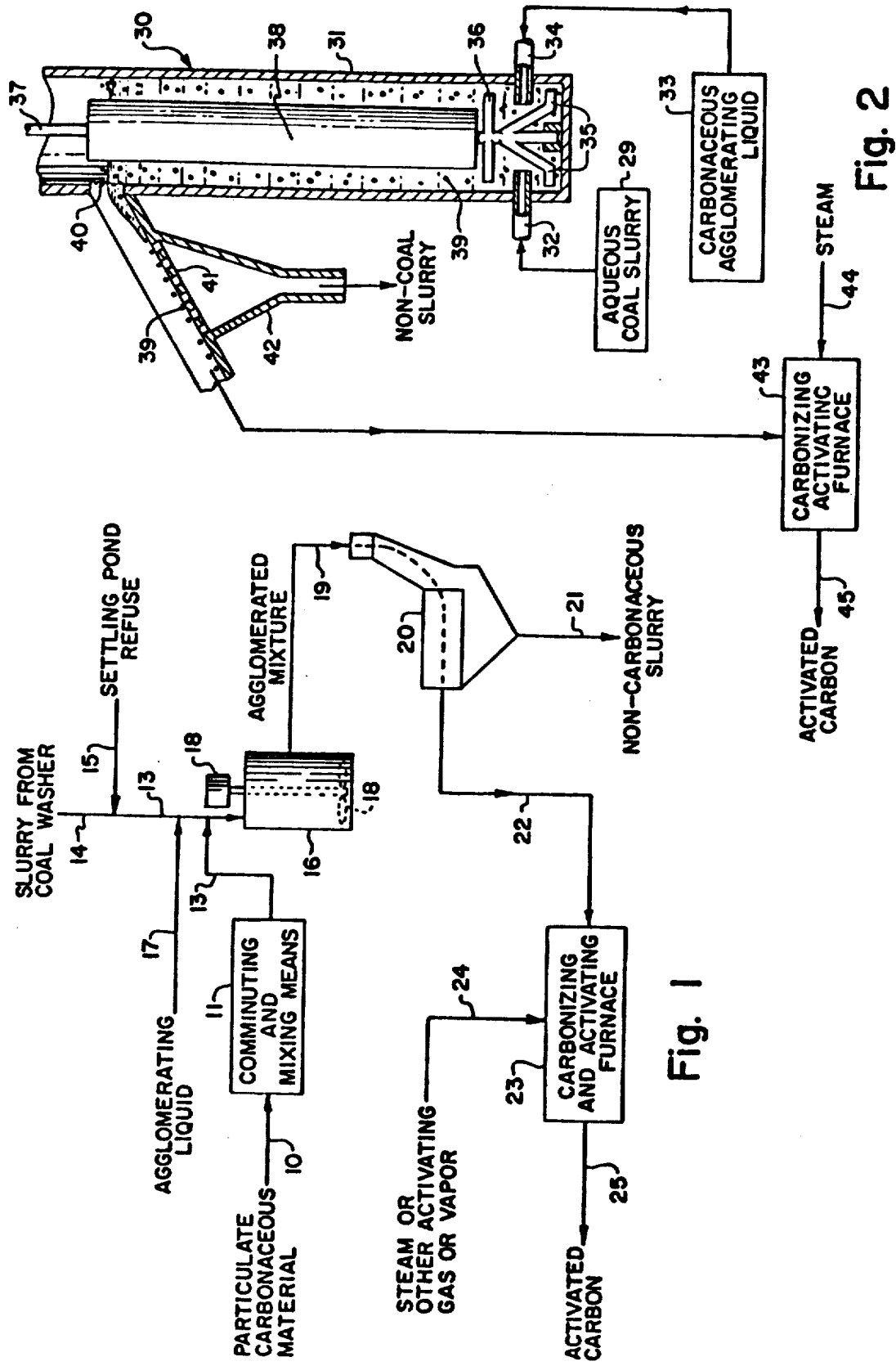

METHOD OF MAKING ACTIVATED CARBON

RELATED APPLICATION

This application is a continuation of application Ser. No. 836,278, filed Sept. 26, 1977, which in turn is a continuation-in-part of application Ser. No. 818,636 filed July 25, 1977, which in turn is a continuation of application Ser. No. 592,762, filed July 3, 1975, all now abandoned.

FIELD OF THE INVENTION

The present invention relates to the making of activated carbon of high surface area, high carbonaceous content and uniform granule size and packing.

BACKGROUND OF THE INVENTION

Activated carbon is an amorphous form of carbon which is specially treated to produce a very large surface area, ranging generally from 300 and 2,000 $m^2/g$. This large surface area means that the internal pore structure has been very highly developed. It is this structure that provides activated carbon with the ability to absorb gases and vapors from gases, and dissolved or dispersed substances from liquids. Activated carbons remove colors, odors and unwanted flavors from gases and solutions by adsorbing the undesired impurities on their surfaces. Activated carbon appears commercially in two forms: light fluffy powders generally used for decolorizing, and hard, dense granules or pellets generally used for vapor adsorption.

Almost any carbonaceous material of either animal, vegetable or mineral origin can be made into activated carbon when properly treated. Activated carbon has been prepared from the blood, flesh and bones of animals; it has been made of vegetable materials including hardwoods, softwoods, corncobs, kelp, coffee beans, rice hulls, fruit pits, nut shells (particularly peanut shells), bagasse and lignin; and it has been made of minerals including peat, lignite, soft and hard coals, tars, pitches, asphalt, petroleum residues, and carbon blacks. However, for economic reasons, bones, wood, peat, lignite and paper mill waste (lignin) are most generally used for the manufacture of powdered carbons, and cocoanut shells, coal, peat and petroleum residues are used for granular carbons.

Regardless of the raw material or the form of the product, activated carbon generally is made by one of two basic methods: chemical or gas activation. Chemical activation depends on the action of inorganic chemicals, e.g. zinc chloride or phosphoric acid, present naturally or added to the raw material to degrade or dehydrate the organic molecules during carbonization or calcination. Gas activation depends on selective oxidation of the carbonaceous matter with air at low temperature, or steam, carbon dioxide, flue gas, chlorine or similar gases or vapors at high temperature. The oxidation is usually preceded by a primary carbonization of the raw material.

The adsorbing power of an activated carbon varies directly with (i) the carbon purity of the activated material, and (ii) the surface area per unit of weight of the activated material. The higher the purity and the greater the bulk of a unit weight of activated carbon, the greater the adsorbing power. Granular carbons also require consideration of the resistance to flow of fluid or gas through a unit weight of the activated carbon. A granular activated carbon is provided in a packed bed, and the gas or liquid to be purified is passed through the packed bed. The more gas or liquid that can be passed through a unit weight of the activated carbon in a given time, and the more uniformly the gas or liquid can pass through the activated carbon, the greater is the absorbing power of the activated carbon. Another consideration for graunular activated carbons is that the granules have sufficient green and finished strength to permit automated processing through drying, carbonizing and activating furnaces and formation of the activated carbon bed.

Accordingly, methods for making activated carbon are directed to (i) decreasing the non-carbonaceous content, (ii) increasing the surface area per unit weight, and (iii) providing more uniformly sized and packed and spherically shaped granular carbon. For example, coal and lignite (e.g. brown coal) have been found to provide more pure activated carbon if first treated with hydrochloric acid to remove ash and then carbonized to remove the chlorinated hydrocarbons, e.g. U.S. Pat. No. 2,040,931 and Ind. Eng. Chem. 38, 7, 745 (1946). Similarly, coal has been processed to increase the surface area per unit of weight, e.g. U.S. Pat. No. 3,483,134, and processed with coal tar, coke-oven and pitch to form spherical granules of essentially uniform size, e.g. U.S. Pat. Nos. 1,478,986, 2,008,145, 3,533,961 and 3,623,999.

The present invention provides a simplified method of making an improved activated carbon from materials such as coal. It inexpensively provides activated carbons with high carbon content and high surface area per unit weight, and with uniform granular size and packing as well as generally spherical shape.

SUMMARY OF THE INVENTION

A method is provided for making at low cost activated carbon and particularly granular activated carbon, having high carbon content and high surface area per unit of weight. The method also enables granules of activated carbon to be made of more uniform, controlled size and packing, and granules of generally spherical shape.

The method commences by dispersing of carbonaceous and non-carbonaceous fine particles, such as coal fine particles, in a suspension liquid, preferably water, to form a slurry of at least 60 percent suspension liquid by weight. Preferably the geometric mean of the particle size distribution is less than 150 microns and also desirably greater than 5 microns. The slurry may be preferably formed by comminuting carbonaceous and non-carbonaceous material, such as coal from a mine, in suitable comminution apparatus and mixing the comminuted carbonaceous and non-carbonaceous fine particles with water. Alternatively, the slurry containing carbonaceous and non-carbonaceous fine particles may be the waste from other processing such as aqueous underflow from a conventional coal washing plant, or slurried sediment and refuse from a settling pond of a coal washing plant. In any case, where coal is used, it is of a non-caking kind as known to coke makers.

The slurry has added to it a free-flowing liquid being liquid below 80° C. and preferably 20° C., lyophobic to the suspension liquid and the non-carbonaceous fine particles and lyophilic to the carbonaceous fine particles to form a mixture, where less than 20 percent and preferably less than 10 percent by weight of the total weight of the free-flowing liquid and carbonaceous and non-carbonaceous fine particles is free-flowing liquid.

The agglomerating liquid is preferably a light hydrocarbon or a mixture of light and heavy hydrocarbons that can be volatilized and/or carbonized along with the carbonaceous fine particles as hereinafter described, having an initial boiling point greater than about 65° C. and preferably greater than 150° C. The mixture is then preferably vigorously agitated to preferentially agglomerate the carbonaceous fine particles into discrete agglomerates, while leaving the non-carbonaceous (ash) fine particles substantially unagglomerated in the mixture. Thereafter, the discrete agglomerates are separated from the mixture. The size and packing (density) of the agglomerates have substantial uniformity, and the size can be controlled by the composition and percentage of the liquid and the degree and duration of the agitation.

The separated agglomerates of carbonaceous fine particles are then carbonized and activated preferably in a conventional furnace to form activated carbon. Typically carbonizing and activation is performed in the same furnace, with the activation preceded by carbonization of the separated agglomerates. Carbonization is performed by heating the discrete agglomerates of separate carbonaceous fine particles to above about 400° C. and preferably above 500° C. Activation is preferably performed by heating the discrete agglomerates of separated carbonaceous particles to at least 800° C. and preferably 800° to 1000° C. in the presence of a material selected from the group consisting of steam, carbon dioxide or flue gas. Alternatively, the agglomerates may be activated by selective oxidation with chlorine or similar gases or vapors at high temperature, or by selective oxidation with air at low temperature.

The size, packing (density) and shape of the activated carbon granules are closely controlled by controlling the agglomeration of carbonaceous fine particles during agiation of the mixture. Specifically, the size and density of the discrete agglomerates is controlled by the composition and additions of the free-flowing liquid, and the rapidity and duration of agitation of the mixture. The shape of the agglomerates is generally spherical, and the agglomerates are generally uniform in size by reason of the operation of agglomeration process.

Other details, objects and advantages of the present invention will become apparent as the following description of the presently preferred embodiments thereof and the presently preferred methods of practicing the same proceeds.

BRIEF DESCRIPTION OF THE DRAWINGS

In the accompanying drawings, the presently preferred embodiments of the invention and the presently preferred methods of practicing the invention are shown, in which:

FIG. 1 is a schematic illustrating various methods of making activated carbon in accordance with the present invention; and FIG. 2 is a schematic illustrating the operation of apparatus utilized in the performance of examples in accordance with the present invention.

DESCRIPTION OF THE PREFERRED EMBODIMENTS

Referring specifically to FIG. 1, activated carbon is made in accordance with the present invention by first dispersing carbonaceous and non-carbonaceous fine particles, preferably from a carbonaceous material, in a suspension liquid to form a slurry. The slurry is at least 60 percent by weight suspension liquid to provide discrete agglomerates as hereinafter described. "Fine particles" are small particles preferably of less than 600 millimeter (28 mesh Tyler) in size and typically less than 0.200 millimeter (65 mesh Tyler) in size. Preferably, the geometric mean particle size of the fine particles dispersed in the suspension liquid is less than 150 microns. Preferred raw material is a readily available material rich in carbon that when finely divided into fine particles contains fine particles of non-carbonaceous material as well as carbonaceous material. Materials particularly suitable are lignite, bituminous coal, anthracite coal, carbon black and coke-oven and wood pitches having a softening point above 80° C., with bituminous and anthracite coal being most preferred.

The carbonaceous material is most desirably an anthracite or bituminous coal of the non-caking kind from a mine, where the carbonaceous fine particles are coal and the non-carbonaceous fine particles are ash. "Ash" fine particles are small particles of materials such as clay and slate that generally appear as ash rather than volatiles on complete burning of the coal. "Non-caking coal" is known to coke makers as determined by the semi-quantitive Gieseler Plastometer Test (ASTM D 1812-69) or the Free-Swelling Index (ASTM D 720-67).

The slurry may be formed in various alternative ways from such mined, non-caking coal. For example, particulate coal 10 may be conveyed directly from a mine to a comminuting means 11. Comminuting means 11 may be any suitable, commercially available comminuting means such as a ball mill. Preferably comminuting means 11 is selected to provide fine particles of substantially uniform size. During grinding in comminuting means 11, water or other suspension liquid is added to disperse coal and ash fine particles to form slurry 13. Slurry 13 contains less than 40 percent, preferably 5 to 40 percent and most desirably 20 to 25 percent solids of carbonaceous and non-carbonaceous fine particles by weight.

Alternatively, slurry 13 may be underflow 14 from a conventional coal washer, which typically has a relative low solids content of about 5 to 15 percent solids in water by weight. Underflow 14 may be mixed with refuse slurry 15 of coal and ash fine particles of relatively high solids content, i.e. at least about 50 percent solids by weight, formed by dispersing the sediment of an existing settling pond adjacent the coal washing plant in water. The mixing of underflow 14 and refuse slurry 15 results in a slurry of 5 to 40 percent and most typically 20 to 25 percent solids of coal and ash fine particles by weight.

Slurry 13 is processed in agitator apparatus 16 to preferentially agglomerate the carbonaceous fine particles to form discrete agglomerates, while the non-carbonaceous (e.g. ash) fine particles remain substantially unagglomerated and dispersed in the slurry. To perform this operation, free-flowing liquid 17 is added to slurry 13 at the inlet to agitator apparatus 17 to form a mixture. Free-flowing liquid 17 is liquid at below 80° C. and below 20 ° C., is lyophobic to the suspension liquid (e.g. water) and to non-carbonaceous fine particles, and lyophilic to carbonaceous fine particles. "Lyophilic" as herein used means that, in a disperse system, there is a marked affinity (wettability) between a disperse component and the dispersion medium and/or another disperse component. Some examples are glue and water, rubber and benzene. "Lyophobic" as used herein means that in a disperse system, there is substantially no affinity (wettability) between the disperse component and the dispersion medium and/or another disperse component. Examples are colloidal "solutions" of metals.

Free-flowing liquid 17 is preferably a hydrocarbon liquid that can be carbonized along with the carbonaceous fine particles as hereinafter described. Materials particularly suitable for free-flowing liquid 17 are light hydrocarbons having an initial boiling point greater than about 65° and preferably greater than 150° C. Specifically suitable are light oil, light fuel oil, heavy fuel oil, diesel fuel and kerosene. Also, suitable are creosote, filtered anthracene oil, hydrogenated filtered antracene oil, lubricating oil such as SAE 20, and chlorinated biphenyls. Heavy hydrocarbon materials such as petroleum crude, oil shale crude, coal tar and pitch may be utilized in certain instances in mixture of up to 50 percent and with light hydrocarbons, but these heavier hydrocarbons cannot be used alone or in mixture of greater quantity. Heavy hydrocarbon liquids typically contain molecular groups lyophilic to non-carbonaceous fine particles as well as carbonaceous fine particles and, therefore, do not provide the degree of separation of carbonaceous fine particles from noncarbonaceous fine particles preferred in the present method. Moreover, such heavy hydrocarbon liquids do not provide sufficient fluidity for the operation of the present invention in forming discrete agglomerates.

Free-flowing liquid 17 is selected and added in measured amounts to control the agglomeration of carbonaceous fine particles as hereinafter described. Preferably, liquid 17 is added in amounts of about 20 to 10 percent by weight and most desirably between 3 and 7 by weight of the total solids in slurry 13 for high recovery, e.g. 88-98 percent weight, and greater amounts up to but not exceeding 20 percent by weight may in some instances be utilized; however, such greater amounts are not preferred because sufficient agglomeration and binding of coal fine particles is not provided, on the one hand, and a waste of highly refined petroleum or coal tar derivative results, on the other hand. Liquid 17 must be added in amounts less than 20 percent by weight to provide discrete agglomerates as the present invention requires.

Mixture of slurry 13 and free-flowing liquid 17 are mixed and agitated in agitator apparatus 16. Agitator apparatus 16 may be any suitable agitating apparatus such as a modified turbine, disc or cone impeller mixer. Preferably, however, agitator apparatus 16 is a tank equipped with a motor driven propeller 18 extending to the bottom portion of the tank as a Premier Mill. In any case, the mixture is vigorously stirred to avoid high shear which would impede the uniformity and growth of the discrete agglomerates.

During agitation in agitator apparatus 16, the carbonaceous fine particles are preferentially wetted by agglomerating liquid 17, which is preferably immiscible to water, and the carbonaceous fine particles agglomerated into coarser particulate. The size of the agglomerates is primarily controlled by the composition and the percentage of liquid 17 added to slurry 13, and is controlled to provide the desired size and density for the granules of activated carbon. For the preferred percentage of 2 to 10 percent by weight of, the discrete agglomerates typically have sizes of from about 1 to 2 millimeters. The time required to effect agglomeration is generally dependent upon the degree of turbulence or agitation, with the shorter agglomeration time being associated with the higher agitation speed. The degree and duration of the agitation in apparatus 16 is also controlled to provide the desired size and packing (density) of the agglomerates.

The discrete agglomerates, being impregnated and having adsorbed on the surfaces thereof liquid 17, (which is generally less dense than the suspension liquid) will tend to float to the top of the mixture. Agglomerated first mixture 19 is thus removed from the top of agitator apparatus 16 to a separator 20, where the discrete agglomerates of carbonaceous fine particles are separated from the suspension liquids and the unagglomerated non-carbonaceous (ash) fine particles by size and/or density. Preferably, separator 20 is a sieve bend of an appropriate mesh size, e.g. 100 ro 200 mesh Tyler, such as that manufactured by authority from DSN NV Vedernaldse Staatsmijnen. Alternatively, other size separators such as an elutriator, cyclone or spiral separator, which is commercially available, may be utilized. Alternatively, the discrete agglomerates may be also separated in a float-sink tank where the agglomerates, which tend to float, are skimmed off by a rotating paddle through an overflow, while the water and unagglomerated non-carbonaceous fine particles, which tend to sink, are removed from the bottom of the tank as slurry 21 containing the non-carbonaceous fine particles and substantially free of carbonaceous fine particles and free-flowing liquid.

At this stage, separated discrete agglomerates 22 of carbonaceous fine particles, which generally contain about 7 to 12 percent moisture, may be processed (not shown) by pelletizing into larger particulate. The agglomerates may be pelletized to generally uniform particle sizes of 0.05 to 0.75 inch in diameter by feeding the agglomerates to pelletizing disc or tumbler along with a binder liquid to form a second mixture and agitate said mixture. Alternatively, the agglomerates may be agitated, extruded or otherwise molded into pellets upon addition of a binder liquid to form said second mixture. Binder liquids particularly suitable for this purpose are heavy hydrocarbons such as coke-oven coal tar, oil shale crude, petroleum crude or heavy fuel oil such as Bunker C, which is preferably heated to, for example, 100° C. to provide fluidity. The requirement for the binder liquid is that it be capable of carbonizing and producing coherent pellets or granules in which the agglomerates are bonded together with sufficient strength to permit mechanized processing and handling without substantial crumbling. The prime purpose of pelletizing is to increase the size of the agglomerates if desired. In this connection, it may be desirable that the product be subsequently oven dried at, e.g. 100° C., to bond the binder to and within the agglomerates. An accelerator is also preferably included in the binder liquid to hasten bonding of the binder in shorter times and/or at lower temperatures.

Whether pelletized or not, separated discrete agglomerates 22 of carbonaceous fine particles are circulated via a pipeline or the like to furnace 23. In furnace 23 the discrete agglomerates 22 are carbonized by heating to at least about 400° C. and preferably above 500° C. Toward the end of the carbonizing cycle, the agglomerates are also preferably activated in furnace 23 by heating to 800° C. and preferable 800° to 1000° C. in the presence of material 24 selected from the group consisting of steam, carbon dioxide and flue gas. Alternatively, although not most preferred chlorine or similar gases or vapors may be utilized at high temperature or air at low temperature to selectively oxidize and activate the separated agglomerates.

On completion of the carbonizing and activating cycles, activated carbon 25 is removed from furnace 23 as a finished product. Activated carbon 25 is a granular composition of substantially uniform size and packing (density) and essentially spherical configuration. The size and packing of the granules can be controlled with relative precision by selection of the free-flowing liquid and control of the relative amount (or percentage) of free-flowing liquid by weight to the total solids content of the slurry that is used. The size and packing of the granules are also controlled to a lesser extent by the rapidity and duration to which the mixture is agitated in the agitation apparatus. Preferably, the barious parameters are controlled so that the discrete agglomerates are between 0.150 millimeter (100 mesh Tyler) and 1.20 millimeter (14 mesh Tyler) in size, which generally requires that the free-flowing liquid be between 5 and 10 percent by weight of the total solids content in the slurry, being liquid at 20° C. and having an initial boiling point greater than 150° C.

The following non-limiting specific examples are given illustrating performance of the present method for making activated carbon.

EXAMPLE I

An aqueous coal slurry was formed from crushed non-coking coal having a particle size of less than 0.150 millimeter (100 mesh Tyler) and water. The slurry had a content of 10 to 40 percent by weight of solids to water. The coal slurry was mixed with a free-flowing liquid in the form of a heavy fuel oil being liquid below 80° C. The quantity of free-flowing liquid utilized was between 6 and 25 percent by weight of the solids in the slurry with which the free-flowing liquid was mixed. The mixture was maintained at 100° F. while agitated within an apparatus as shown in FIG. 2 of the drawings.

The coal slurry was introduced to the bottom of a cylindrical tank 31 of agitator apparatus 30 by way of inlet 32, while free-flowing liquid 33 was introduced by way of inlet 34. The resulting mixture is subjected to the agitating action of scrapper blades 35 and agitator blades 36 connected to rotating shaft 37, which is driven by power means (not shown). Also connected to shaft 37 is inner cylindrical housing 38, which is provided to channel the mixture helically through the agitator apparatus 30.

Accordingly, coal slurry 29 is continuously feed into the bottom of housing 31 and subjected to rapid agitation as it flows upwardly between the inner rotating cylindrical housing 38 and the outer cylindrical housing 31. As a result of the lyophilic action of the free-flowing liquid 33 and the agitation in the mixture. Discrete agglomerates 39 are formed within apparatus 30, and overflow from the agitating apparatus 30 at the top over screened outlet 40.

At outlet 40, discrete agglomerates 39 flow over screen 41 of appropriate mesh to provide for separation of the agglomerates from the water and non-carbonaceous (ash) fine particles. Discrete agglomerates 39 are 1/16 to ¼ inch in size as they come into screen 41. The water and ash fine particles pass through the screen 41 and are discharged through funnel 42.

Discrete agglomerates of increased size and hardness as compared to the fines in the coal slurry were obtained by use of agitator apparatus 30. Also, the non-carbonaceous (ash) content of the discrete agglomerates was reduced as compared to the content of the coal slurry entering the apparatus. The results of this processing are shown in TABLE I below.

TABLE I

| Sample of Coal Slurry | Percentage Of Solids By Weight | | Free-flowing liquid Content of Agglomerates |
|---|---|---|---|
| | Ash Content of Coal Slurry | Ash Content of Agglomerates | |
| 1 | 12.1 | 7.7 | 13.6 |
| 2 | 10.4 | 4.7 | 19.4 |
| 3 | 21.8 | 4.7 | 17.2 |
| 4 | 32.6 | 5.6 | 15.0 |

The discrete agglomerates as above formed are then placed in an electric furnace and heated to 500° C. until the agglomerates become dull red in color. Thereafter, steam is introduced into the furnace, and the heating continued at 800° C. to compensate for the cooling effect of the steam. The separated agglomerates are thus carbonized and the agglomerates activated in furnace 43. Free-flowing liquid 33 is volitilized in the process. Activated carbon 45 is granular form is subsequently removed from furnace 43.

EXAMPLE II

Coal slurry 29 was again introduced to apparatus 30 as above described while maintaining an operating temperature of room temperature rather than 100° F. as used in connection with Example I. The free-flowing liquid 33 was changed by adding a light solvent to the heavy fuel oil to lower the viscosity of the liquid to be free-flowing at below 20° C. (room temperature). The quantity of light solvent added was 10 to 15 percent by weight of the undiluted fuel oil used.

The mixing and agitation steps were performed in the same way as described in connection with Example I. And the carbonizing and activating steps in furnace 43 were performed as described in connection with Example I. The resulting activated carbon 45 again had a granular size of substantially uniform packing (hardness) and particle size, and had a high carbon content (about 96 percent) and internal surface area estimated to be about 3500 square feet per gram.

While the preferred embodiments of the invention have been specifically described, it is distinctly understood that the invention may be otherwise variously embodied and used within the scope of the following claims.

What is claimed is:

1. A method of making activated carbon from an organic solid having carbonaceous and non-carbonaceous fine particles selected from the group consisting of coal, lignite and peat, said fine particles having a geometric mean particle size of less than 150 microns, comprising the steps of:

A. dispersing the carbonaceous and non-carbonaceous fine particles in water to form a slurry of at least 60 percent water by weight;

B. adding to the slurry a light hydrocarbon liquid being liquid at below 20° C., and being lyophilic to the carbonaceous fine particles and lyophobic to the water and the non-carbonaceous fine paraticles to form a mixture where less than 20 percent by weight of the light hydrocarbon liquid and the carbonaceous and non-carbonaceous fine particles is the light hydrocarbon liquid;

C. agitating the mixture to selectively agglomerate the carbonaceous fine particles into discrete agglomerates, while the non-carbonaceous fine particles remain substantially unagglomerated in the mixture;

D. separating discrete agglomerates of carbonaceous fine particles from the mixture;

E. carbonizing the discrete agglomerates by heating to at least 400° C.; and

F. activating the carbonized discrete agglomerates of carbonaceous fine particles to form activated carbon.

2. A method of making activated carbon as set forth in claim 1 wherein:

less than 10 percent by weight of the light hydrocarbon liquid and the carbonaceous and non-carbonaceous fine particles in the mixture formed in Step B is the light hydrocarbon liquid.

3. A method of making activated carbon as set forth in claim 1 wherein:

activating in Step F is performed by heating the separated discrete agglomerates to at least 800° C. in the presence of material selected from the group consisting of steam, carbon dioxide and flue gas.

4. The method of making activated carbon of claim 1 wherein the light hydrocarbon liquid contains up to 50 percent of a heavy hydrocarbon liquid.

5. A method of making activated carbon from coal having both carbonaceous and ash fine particles having a geometric mean particle size distribution of less than 150 microns comprising the steps of:

A. dispersing the carbonaceous and ash fine paraticles of coal in water to form a slurry of at least 60 percent water by weight;

B. adding to the slurry a light hydrocarbon liquid being liquid at below 20° C., and lyophilic to the carbonaceous fine particles in coal and lyophobic to the water and ash fine particles in the coal to form a mixture where less than 20 percent by weight of the light hydrocarbon liquid and the carbonaceous and ash fine particles is the light hydrocarbon liquid;

C. agitating the mixture to selectively agglomerate the carbonaceous fine particles in the coal to form discrete agglomerates, while the ash fine particles in the coal remain substantially unagglomerated in the mixture;

D. separating discrete agglomerates of carbonaceous fine particles from the mixture;

E. carbonizing the separated agglomerates of carbonaceous fine particles by heating to at least 400° C.; and F. activating the carbonized agglomerates of carbonaceous fine particles to form activated carbon.

6. A method of making activated carbon as set forth in claim 5 wherein:

less than 10 percent by weight of the light hydrocarbon liquid and the carbonaceous and ash fine particles in the mixture formed in Step B in the light hydrocarbon liquid.

7. A method of making activated carbon as set forth in claim 5 wherein:

activating in Step F is performed by heating the separated discrete agglomerates to at least 800° C. in the presence of material selected from the group consisting of steam, carbon dioxide and flue gas.

* * * * *